(12) United States Patent
Zimmerschied et al.

(10) Patent No.: US 11,286,836 B2
(45) Date of Patent: Mar. 29, 2022

(54) METHOD FOR MONITORING AN EXHAUST AFTERTREATMENT SYSTEM OF A COMBUSTION ENGINE

(71) Applicant: Robert Bosch GmbH, Stuttgart (DE)

(72) Inventors: Ralf Zimmerschied, Stuttgart (DE); Martin Stephani, Ludwigsburg (DE); Yunjie Lian, Hemmingen (DE)

(73) Assignee: Robert Bosch GmbH, Stuttgart (DE)

( * ) Notice: Subject to any disclaimer, the term of this patent is extended or adjusted under 35 U.S.C. 154(b) by 272 days.

(21) Appl. No.: 16/660,414

(22) Filed: Oct. 22, 2019

(65) Prior Publication Data

US 2020/0131970 A1    Apr. 30, 2020

(30) Foreign Application Priority Data

Oct. 24, 2018 (DE) ...................... 10 2018 218 209.4

(51) Int. Cl.
*F01N 11/00* (2006.01)

(52) U.S. Cl.
CPC ........ *F01N 11/002* (2013.01); *F01N 2550/04* (2013.01); *F01N 2560/08* (2013.01); *F01N 2900/1406* (2013.01)

(58) Field of Classification Search
CPC ............... F01N 11/002; F01N 2550/04; F01N 2900/1406
See application file for complete search history.

(56) References Cited

U.S. PATENT DOCUMENTS

| | | | |
|---|---|---|---|
| 7,396,389 B2* | 7/2008 | Kariya | B01D 46/46 95/273 |
| 10,323,562 B2* | 6/2019 | Van Nieuwstadt | F01N 3/031 |
| 11,092,058 B1* | 8/2021 | Fukami | F01N 3/0205 |
| 2015/0240696 A1* | 8/2015 | Saitou | F02D 41/222 73/114.76 |
| 2016/0251995 A1* | 9/2016 | Tsu | F01N 11/00 701/33.7 |
| 2018/0087432 A1* | 3/2018 | Odendall | G01M 15/106 |
| 2019/0048776 A1* | 2/2019 | Van Nieuwstadt | F01N 1/168 |
| 2019/0048777 A1* | 2/2019 | Rollinger | F01N 13/008 |
| 2019/0178142 A1* | 6/2019 | Maeda | F01N 11/002 |
| 2019/0257235 A1* | 8/2019 | Van Nieuwstadt | F01N 3/021 |
| 2019/0277180 A1* | 9/2019 | Dudar | F01N 3/021 |
| 2020/0155993 A1* | 5/2020 | Wunderlich | B01D 46/446 |
| 2021/0102487 A1* | 4/2021 | Baumann | F01N 11/00 |

FOREIGN PATENT DOCUMENTS

EP    2942505 A1 * 11/2015 ............ F01N 11/002

* cited by examiner

*Primary Examiner* — Ngoc T Nguyen
(74) *Attorney, Agent, or Firm* — Michael Best & Friedrich LLP

(57) ABSTRACT

A method is described for monitoring an exhaust aftertreatment system of a combustion engine, with a pressure difference sensor that captures a first pressure difference between a first sampling point and a second sampling point. A second pressure difference between the second sampling point and the environment is captured. A defect is detected based on the second pressure difference.

10 Claims, 4 Drawing Sheets

METHOD FOR MONITORING AN EXHAUST AFTERTREATMENT SYSTEM OF A COMBUSTION ENGINE

BACKGROUND OF THE INVENTION

The invention is based on a method for monitoring an exhaust aftertreatment system of a combustion engine.

In modern combustion engines, exhaust aftertreatment systems are used to clean the exhaust gas. For example, particulate filters are used to remove particles from the exhaust gas. Differential pressure sensors are used to monitor these exhaust aftertreatment systems, especially the particulate filters. Such a pressure difference sensor determines a pressure difference between a first sampling point and a second sampling point. The first sampling point is usually disposed before the particulate filter and the second sampling point is usually disposed after the particulate filter. The load state of the particle filter is concluded from the pressure difference and the regeneration of the particulate filter is controlled depending on the load state.

Usually, the pressure difference sensor is connected to the first sampling point via a first pressure line and to a second sampling point via a second pressure line. Hoses made of plastic are preferably used as pressure lines. In the event of a defect of this pressure line, for example in the case of deterioration of the line because it has not been properly fastened or damage to the line that leads, for example, to a hole in the pressure line or to a crack in the pressure line, the measurement of pressure difference is affected. This also affects the control of the particulate filter. It is therefore desirable for such damage to the pressure line to be reliably detected. Until now, methods are known that detect deterioration or damage to the pressure line using the amplitude of vibrations of the pressure difference.

SUMMARY OF THE INVENTION

By contrast, the method according to the invention has the advantage that an error can be detected reliably and easily. A second pressure difference between the second sampling point and the environment is recorded to monitor the pressure line. A defect, in particular of the pressure line, is detected based on said second pressure difference.

By using a second pressure difference, a reliable and simple diagnostic procedure is possible. This is due to the fact that another signal is available and, on the other hand, that this further signal is less distorted. Furthermore, the measurement is not affected by the loading of the particulate filter.

It is particularly advantageous that a defect in the line between one of the sampling points and the pressure difference sensor is detected. It is particularly advantageous that a defect between the sampling point downstream of the particle filter and the pressure difference sensor can be detected. Preferably, a leakage in the pipe or a deterioration of the pipe are detected as defects.

In the case of a particularly advantageous design, the check is only carried out if certain operating conditions of the combustion engine exist. These are in particular operating states in which the exhaust mass flow exceeds a certain value. Reliable detection of defects is possible in these operating states.

In a first advantageous embodiment, a defect is detected when the second pressure difference is close to zero.

In a second advantageous embodiment, a defect is detected if the second pressure difference does not change when the operating state changes.

In a third advantageous embodiment, a defect is detected if the ratio between the first pressure difference and the second pressure difference is greater than a predetermined value.

The three embodiments can be applied individually. However, it may also be envisaged that said embodiments will be combined. In this case, 2 or 3 of the monitoring versions are carried out. It can also be provided that faults are only detected if 2 or 3 of the monitors detect faults.

In another aspect, the invention relates to a new program code together with processing instructions for creating a computer program that runs on a control unit, in particular source code with compiler and/or linking instructions, wherein the program code results in the computer program for performing all steps of one of the described methods, if it is converted according to the processing instructions into an executable computer program, i.e. in particular it compiles and/or links. This program code may be specified in particular by source code, which can be downloaded from a server on the Internet, for example.

BRIEF DESCRIPTION OF THE DRAWINGS

Exemplary embodiments of the invention are shown in the drawings and explained in more detail in the following description.

DETAILED DESCRIPTION

Figure 1:
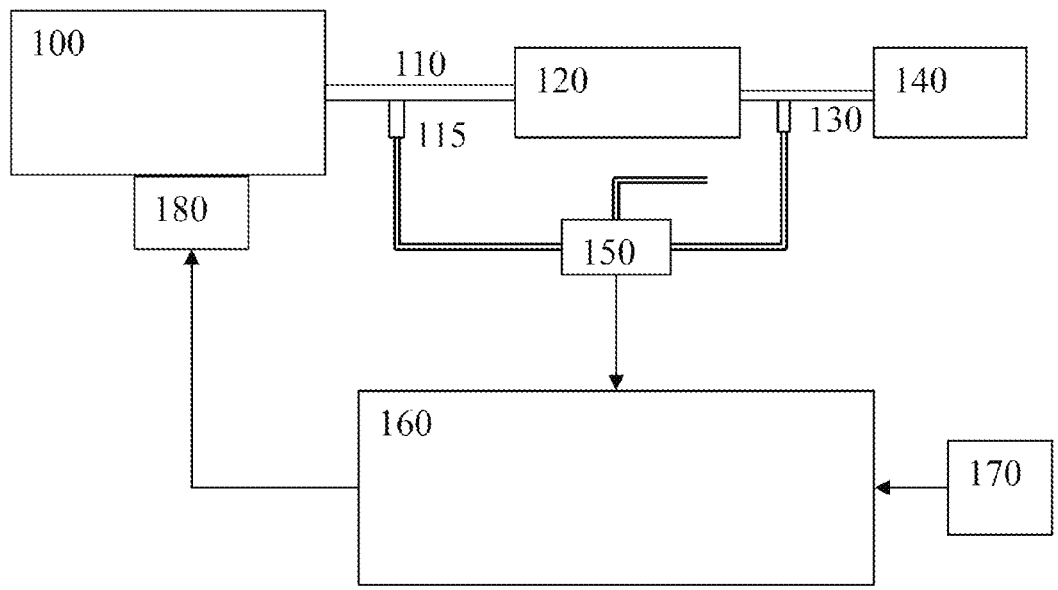
FIG. 1 shows essential elements of an exhaust aftertreatment system.

FIG. 1 shows the essential elements of an exhaust aftertreatment system. A combustion engine is designated by 100. From this, exhaust gas passes via an exhaust pipe 110 to an exhaust aftertreatment system 120 and from there into the environment via a second exhaust pipe 130 and further components 140 if necessary. The exhaust aftertreatment system 120 is a particulate filter in the case of the exemplary embodiment described below. The other elements 140 are, for example, a silencer. In the first exhaust pipe 120, a first sampling point 115 is arranged between the combustion engine and the particulate filter 120. In the second exhaust pipe 130 a second sampling point 135 is arranged between the particulate filter and the silencer 140. The two sampling points are each connected to a pressure line with a pressure difference sensor 150. Said pressure sensor 150 detects a first pressure difference between the two exhaust pipes before and after the particulate filter 120. This first pressure difference is a measure of the load on the particle filter 120 and is fed to a control unit 160. The control unit also evaluates the signals of other sensors 170 and subjects various adjusters 180 on the combustion engine 100 to control signals.

Furthermore, the pressure difference sensor 150 is connected to the environment via a further pressure line. With a suitable arrangement, this further pressure line to the environment can be omitted. This means that the pressure difference sensor 150 detects a second pressure difference between one of the two sampling points and the ambient pressure. Preferably, the second pressure difference between the second sampling point and the environment is recorded.

Based on the first pressure difference between the first and second sampling points, the control unit 160 calculates a control signal for controlling the actuator 180 using further signals of the sensors 170. For example, the load state of the particulate filter is determined based on the first pressure difference across the particle filter. Depending on the load state, a regeneration operation for the particulate filter is initiated by controlling the actuators 180, for example the injection valves. Here, for example, an additional fuel injection is carried out, which leads to heating of the exhaust gas and thus to heating of the particulate filter. By heating the particulate filter, the soot particles deposited in the particulate filter are oxidized.

In the event of a defect in the pressure line between one of the sampling points and the pressure difference sensor, the load state of the particulate filter is no longer correctly detected. A method for monitoring an exhaust aftertreatment system, in particular the pressure lines between the pressure difference sensor and the two sampling points, is described below. For this purpose, a second pressure difference between the sampling point to be monitored and the environment is detected and a defect of the pressure line between the sampling point and the pressure difference sensor is detected based on this second pressure difference.

Figure 2:
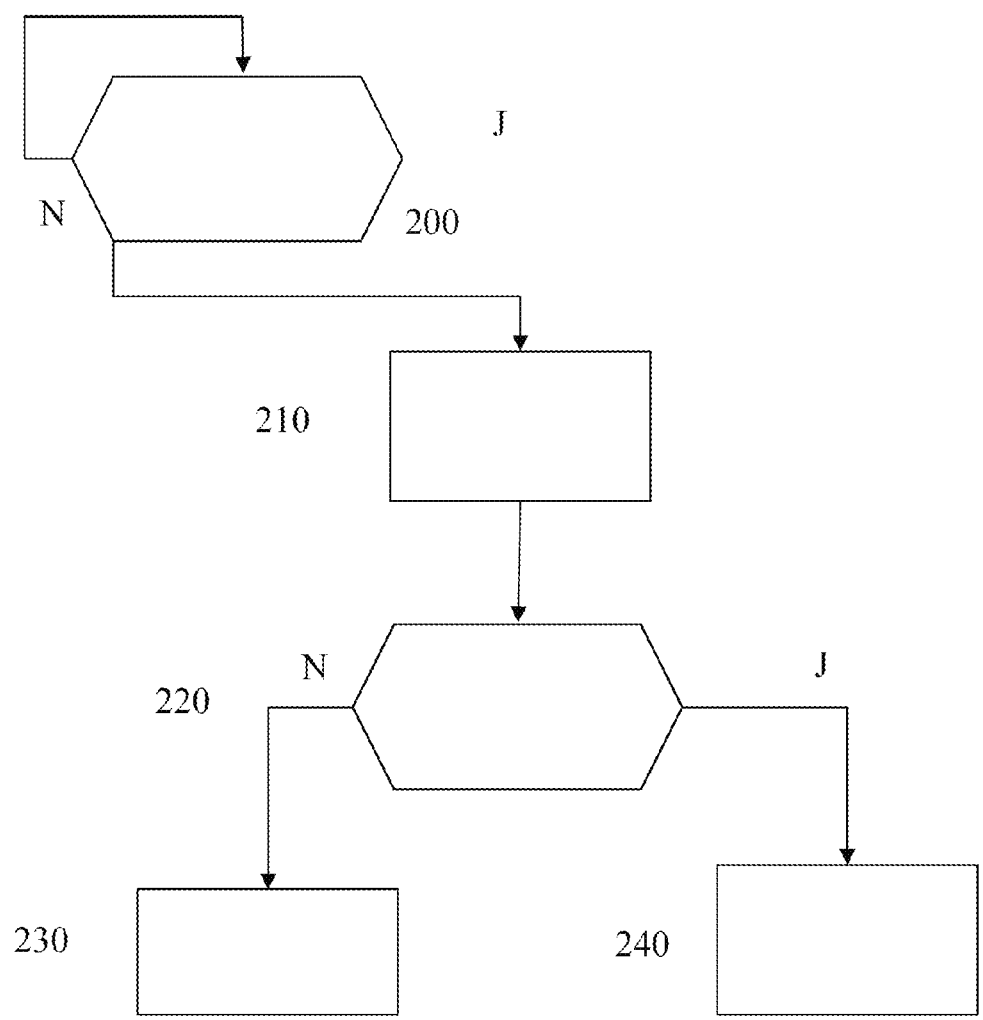
FIG. 2 shows a first embodiment.
Figure 3:
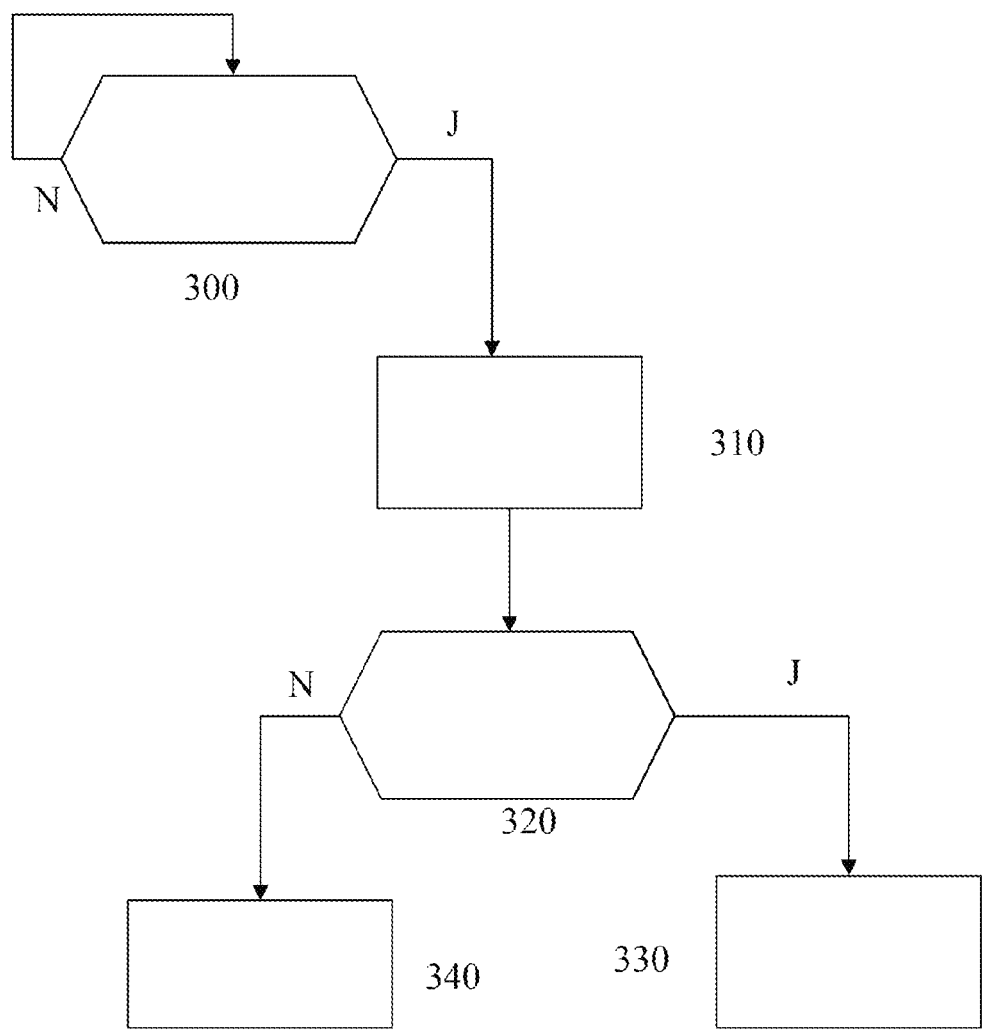
FIGS. 3 and 4 show second and third embodiments of the method according to the invention.
Figure 4:
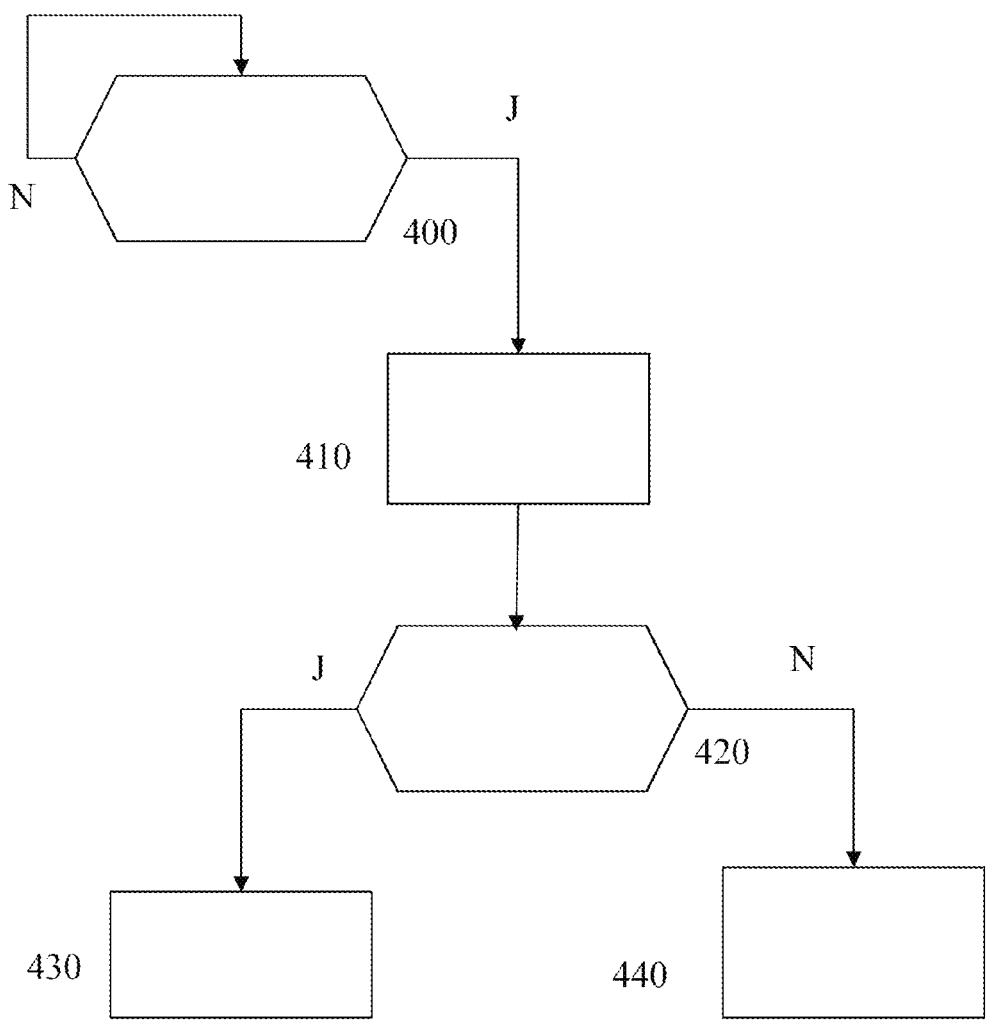

In FIG. 2, a first embodiment of the procedure according to the invention is shown. In this embodiment, the second pressure difference between the environment and the second sampling point is evaluated. Usually, the second sampling point has a pressure difference relative to the environment due to the installation position thereof. However, this is only the case as long as the combustion engine is running and a corresponding exhaust flow is flowing through the exhaust pipes. In this case, a certain pressure difference relative to the environment builds up through the silencer at the second sampling point 135. According to the invention, it was recognized that in the case of a defect of the pressure line between the second sampling point 135 and the pressure difference sensor 150, no pressure difference relative to the environment can be perceived by the pressure difference sensor 150. As soon as the pressure line has a leakage, the ambient pressure is set in the pressure line.

According to the invention, a check is made as to whether the pressure difference between the second sampling point 135 and the environment is around zero in an interval. This means that a defect is detected when the pressure difference is less than a threshold value. The threshold value lies within a few percent of the maximum signal amplitude of the pressure difference sensor. By taking this threshold value into account, sensor tolerances and interference can be compensated. According to the invention, the evaluation is carried out only if there is an operating point of the combustion engine at which a corresponding exhaust mass flow is flowing through the exhaust pipe and a pressure difference forms across the silencer. If in these states the pressure difference is zero for a certain time within an interval with sufficient exhaust mass flow, a deterioration or a defect of the pressure line is detected between the second sampling point and the pressure difference sensor.

For this purpose, an initial query 200 checks whether the exhaust mass flow is greater than zero. This is done, for example, in such a way that a check is carried out as to whether the speed of the combustion engine and/or the fuel quantity injected, or a corresponding substitute variable for the injected fuel quantity, are greater than a certain threshold value. Alternatively, a check is carried out as to whether there is an operating state in which the exhaust gas flow is greater than zero. If this is not the case, the query 200 is carried out again or the monitoring program ends.

If this is the case, the pressure difference between the second sampling point 135 and the environment is measured by the pressure difference sensor 150 in step 210. The subsequent query 220 checks whether the second pressure difference is greater than zero. If this is the case, step 240 detects that there is no defect. If this is not the case, i.e. the pressure difference is varying around zero in an interval, then a defect is detected in step 230.

With a further method for defect monitoring, a check is again carried out as to whether the pressure difference between one of the two sampling points and the environment changes in the event of a change in the operating current or a change in the operating state. To do this, a check is made as to whether the operating state is currently changing. This can be carried out, for example, by forming the time derivative of the volume or the mass flow through the exhaust pipe. If this exceeds a predetermined threshold value, the check is carried out. Instead of the volume or mass flow, a corresponding signal calculated by means of a model for the mass or volume flow of the exhaust gas can be used.

An initial query 300 checks whether there has been a change in the operating state of the combustion engine. This can be done, for example, by differentiating the volume flow or the mass flow that flows through the exhaust pipes. If the time derivative exceeds a predetermined value, such a change in the operating state is detected. In this case, step 310 is carried out. If this is not the case, the monitoring program ends or step 300 is carried out again. In step 310, the pressure difference is preferably measured several times. The subsequent query 320 checks whether the pressure difference is changing or constant. If query 320 detects that the pressure difference is constant, step 330 detects a defect. If query 320 detects that the pressure difference is not constant, step 340 detects defect-free operation.

Whether the pressure difference is constant is preferably detected by differentiating the output signal of the pressure difference sensor 150 against time. If the time derivative of the output signal is less than a threshold value, a constant pressure difference is detected.

In a particularly advantageous embodiment, the signal energy of the pressure difference sensor is evaluated here. The signal energy is calculated from the squared signal of the pressure difference sensor. This sums positive and negative components of the signal to a positive value of the signal energy.

In a further embodiment, the ratio of the two pressure difference signals is formed and evaluated. In a preferred embodiment, the signal energy of the pressure difference signals is considered.

According to the invention, it was recognized that in the case of a defect, in particular a leakage or a deterioration of the pressure line downstream of the particle filter 120, the first pressure difference no longer corresponds to the pressure difference between the two sampling points, but to the pressure difference between the first sampling point and the environment. This means that in the case of a defect, the first pressure difference assumes a greater value than in the defect-free state. The second pressure difference, on the other hand, assumes a value of zero, because the pressure line to the second sampling point is connected to the environment. This means the ratio of the two pressure differences is always greater for a defect than in the correct state.

For this purpose, an initial query 400 checks whether the exhaust mass flow is greater than zero. This is preferably done according to the query 200. If this is not the case, the query 400 is carried out again or the monitoring program ends.

If this is the case, the pressure difference between the second sampling point 135 and the environment is measured in step 410 by the pressure difference sensor 150. The subsequent query 420 verifies that the ratio between the first pressure difference D1 and the second pressure difference D2 is greater than a threshold value. If this is not the case, step 440 detects that there is no defect. If this is the case, i.e. the ratio of the two pressure differences is greater than in error-free operation, then errors are detected in step 430.

The invention claimed is:

1. A method for monitoring an exhaust aftertreatment system of a combustion engine, the method comprising:
   detecting, via a pressure difference sensor, a first pressure difference between a first sampling point and a second sampling point,
   detecting a second pressure difference between the second sampling point and the environment, and
   determining, with a computer, a defect on the basis of the second pressure difference.

2. The method according to claim 1, wherein the defect is determined in a pressure line between one of the first and second sampling points and the pressure difference sensor.

3. The method according to claim 1, further comprising determining that an exhaust gas flow exceeds a gas value.

4. The method according to claim 1, further comprising determining that an exhaust gas flow through the exhaust aftertreatment system exceeds a threshold value.

5. The method according to claim 1, wherein the first sampling point is arranged on a high pressure side of a particulate filter and that a second sampling point is arranged in the exhaust aftertreatment system on a low pressure side of a particulate filter.

6. The method according to claim 1, wherein the defect is determined when the second pressure difference is about zero.

7. The method according to claim 1, wherein the defect is determined when the second pressure difference does not change in the event of a change in an operating state of the combustion engine.

8. The method according to claim 1, wherein the defect is determined when the ratio between the first pressure difference and the second pressure difference is greater than a predetermined value.

9. A non-transitory, computer-readable storage medium containing instructions that when executed by a computer, cause the computer to detect, via a pressure difference sensor in an exhaust aftertreatment system of a combustion engine, a first pressure difference between a first sampling point and a second sampling point,
   detect a second pressure difference between the second sampling point and the environment, and
   determine a defect on the basis of the second pressure difference.

10. A control unit comprising a computer configured to
    detect, via a pressure difference sensor in an exhaust aftertreatment system of a combustion engine, a first pressure difference between a first sampling point and a second sampling point,
    detect a second pressure difference between the second sampling point and the environment, and
    determine a defect on the basis of the second pressure difference.

* * * * *